(No Model.)
J. W. HYATT.
PROCESS OF MAKING KEY BOARDS FOR MUSICAL INSTRUMENTS.
No. 254,438. Patented Feb. 28, 1882.
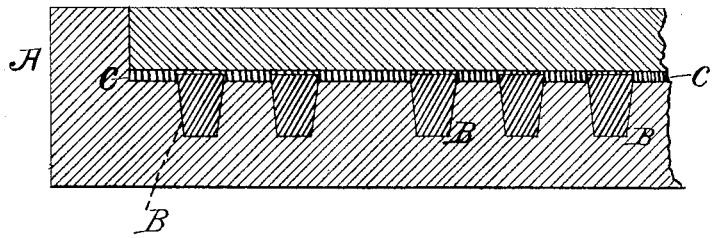
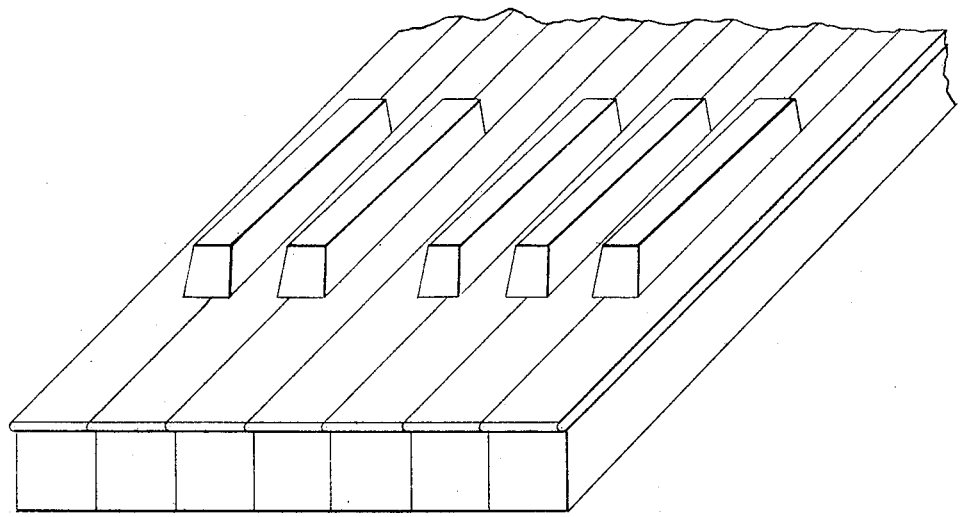
WITNESSES:
Chas. P. Gill
E. S. Sargent.
INVENTOR:
John W. Hyatt
BY Rowland Cox
ATTORNEY.

UNITED STATES PATENT OFFICE.

JOHN W. HYATT, OF NEWARK, NEW JERSEY, ASSIGNOR TO THE BONSILATE COMPANY, (LIMITED,) OF ALBANY, NEW YORK.

PROCESS OF MAKING KEY-BOARDS FOR MUSICAL INSTRUMENTS.

SPECIFICATION forming part of Letters Patent No. 254,438, dated February 28, 1882.

Application filed May 2, 1881. (No model.)

*To all whom it may concern:*

Be it known that I, JOHN W. HYATT, of Newark, in the county of Essex and State of New Jersey, have invented a new and useful Improvement in Keys for Pianos, Organs, and Analogous Instruments, of which the following is a specification, reference being had to the accompanying drawings, in which—

Figure 1 is a central vertical section through the die or mold, and Fig. 2 is a perspective view of the completed article.

The invention has relation to improvements in the manufacture of the keys and key-boards of pianos, organs, and analogous instruments.

In the construction of the key-boards of the class of instruments to which the invention relates it is customary to provide a key-board blank of the size of the key-board, from which the keys are cut by means of a saw and afterward provided with appropriate veneers, each key being finished separately.

In Letters Patent No. 210,780, granted to me for improvements in piano-keys, a method is described in which the key-board blank is covered with a sheet or scroll of plastic material, which is cemented to the blank, after which the keys are severed by sawing or otherwise. By this means the loss of time and labor that is incidental to the operation of finishing each key separately is avoided.

The present invention has for its object the production of a key-board composed of what are known as both the "white" and "black" keys by forming or molding a section of the key-board—preferably an octave—in a single piece, securing a number of the pieces so molded to the key-board blank to form the complete key-board, and then severing the keys by means of a saw or otherwise. The sections or octaves, having been molded, may be easily and accurately fitted together and cemented or otherwise fastened to the key-board blank to form the complete key-board, after which the keys will be separated in the customary way. The details of construction are fully set forth hereinafter.

In the accompanying drawings, A denotes a mold or die of appropriate construction, the matrix of which is in the form of the upper surface of a section or part—preferably an octave—of the key-board of a piano or organ, the channels or cavities B being depressed to form the black keys, and the portion C being of a thickness adapted to form the white keys. The molding of the section or octave will be effected in any convenient manner. I prefer, however, to employ a material which may be successfully treated by compression in heated dies or molds, as I believe a better result will be accomplished where heat and pressure are used; but the materials used and method of molding are matters of judgment, which will be governed by circumstances.

In the construction of the keys any appropriate material may be employed, the same being introduced into the die or mold in any convenient manner. I prefer, however, to apply the material out of which the white keys are made in the form of a sheet, which may be molded or otherwise fabricated to cover the horizontal portion of the die or mold which is above the edges of the channels or depressions c, in which the black keys are placed or formed. The material out of which the black keys are made may be first introduced into the channels or grooves, after which that out of which the white keys are to be formed may be introduced and the pressure and heat applied. The section or octave having been formed as hereinbefore recited, a number will be cemented upon the key-board blank until a complete key-board has been formed, after which the keys will be separated by sawing in the customary manner.

I do not limit myself to any particular material, nor to any particular method of casting or molding the section, part, or octave, nor to any particular manner of securing it to the blank; but

What I claim, and desire to secure by Letters Patent, is—

1. The within-described process of forming a key-board for pianos or organs, which consists in, first, introducing the material out of which the black keys are to be formed in an appropriate die or mold; second, introducing in the mold the material out of which the white keys are intended to be formed; third, uniting the materials by means of heat and pressure to form a complete key-board or section thereof; fourth, securing the board or section thereof to the key-board blank; fifth, severing the keys by sawing or otherwise, substantially as set forth.

2. The process herein described of forming a complete key-board for pianos and organs, which consists in, first, forming an octave or section of both black and white keys by means of a die or mold; second, securing a number of the octaves or sections so formed to the key-board blank to form a complete key-board; third, severing the keys by sawing or otherwise.

In testimony that I claim the foregoing improvement in keys for pianos, organs, and analogous instruments, as above described, I have hereunto set my hand this 21st day of April, 1881.

JOHN W. HYATT.

Witnesses:
 CHAS. C. GILL,
 E. S. SARGENT.